Feb. 25, 1958 C. E. NEISLER, JR., ET AL 2,824,589
INFLATABLE DEVICE OF PREDETERMINED SURFACE CONTOUR
Filed April 28, 1955 2 Sheets-Sheet 1
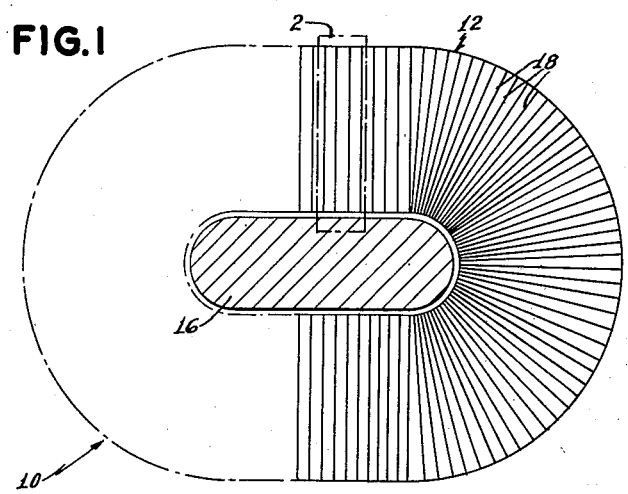
FIG. 1
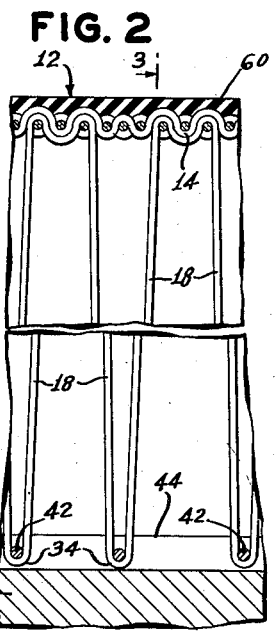
FIG. 2
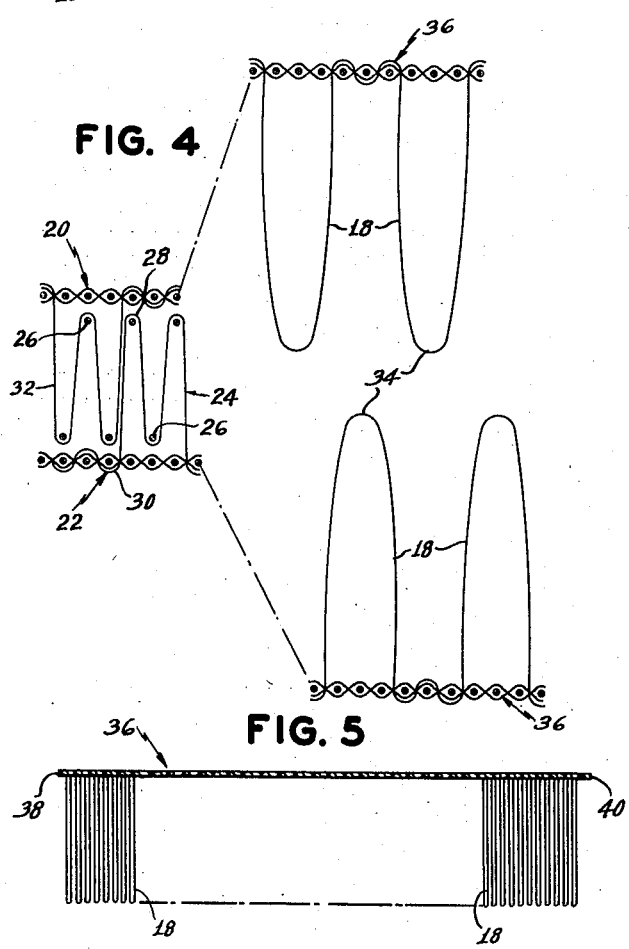
FIG. 4
FIG. 5
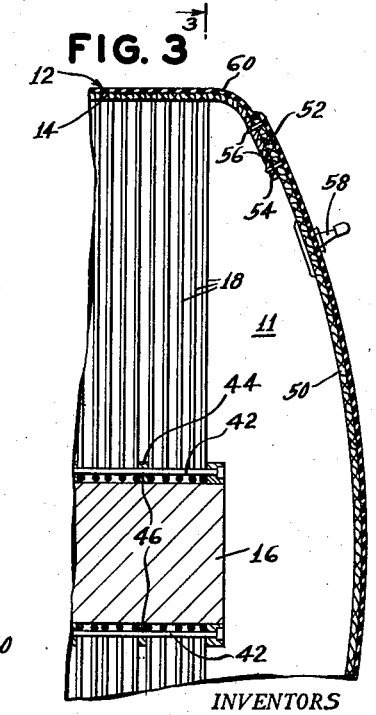
FIG. 3
INVENTORS
Charles E. Neisler, Jr.
BY Paul Mauney
ATTORNEYS Feb. 25, 1958   C. E. NEISLER, JR., ET AL   2,824,589
INFLATABLE DEVICE OF PREDETERMINED SURFACE CONTOUR
Filed April 28, 1955                                       2 Sheets-Sheet 2
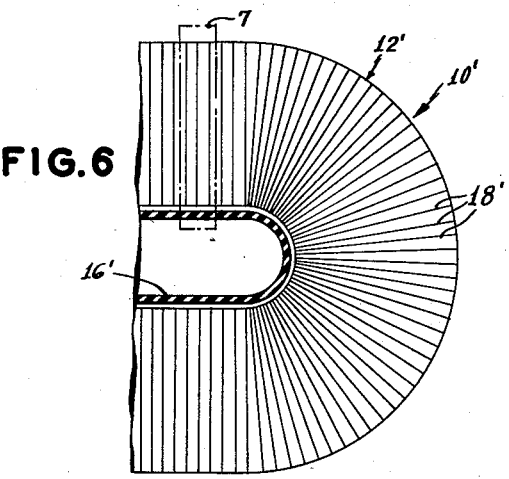
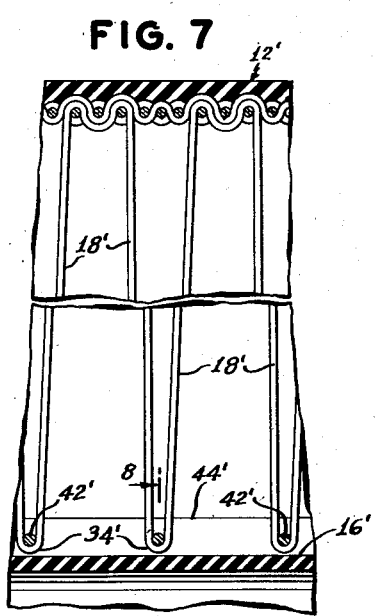
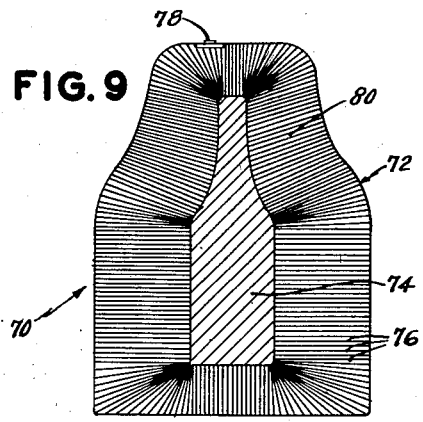
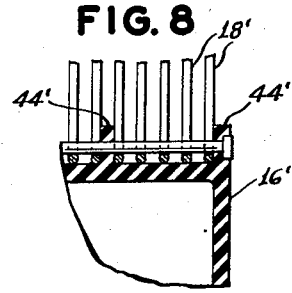
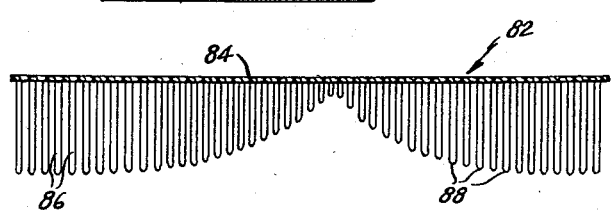
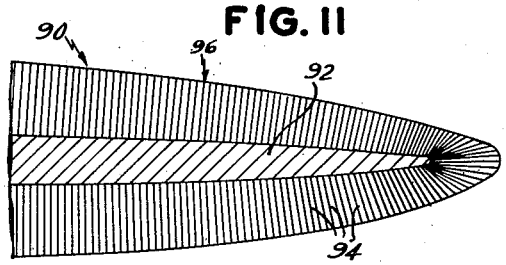
INVENTORS
Charles E. Neisler, Jr.
Paul Mauney
BY
Edwin Linrod + Henry Cole
ATTORNEYS United States Patent Office 2,824,589
Patented Feb. 25, 1958

2,824,589

INFLATABLE DEVICE OF PREDETERMINED SURFACE CONTOUR

Charles Eugene Neisler, Jr., and Paul Mauney, Kings Mountain, N. C., assignors to Neisler Brothers, Incorporated, a corporation of North Carolina Application April 28, 1955, Serial No. 504,436

11 Claims. (Cl. 150—.5)

This invention relates generally to an inflatable device of predetermined surface contour.

One object of the present invention is the provision of a light weight, internally reinforced, and readily collapsible inflatable device which may be of any desired surface contour, said device being utilizable for a multiple of utilitarian applications in any desired form, such as in the form of airfoils or airfoil sections, receptacles of predetermined surface shapes, and camouflaged objects of desired shapes.

Another object of the present invention is the provision of an inflatable device of predetermined surface contour which is provided with internally disposed structure for reinforcing the device and predetermining the shape thereof, said device in its inflated condition having a surface contour which is predetermined by such internally disposed structure.

The above and other objects, features and advantages of the present invention will be more fully understood from the following description considered in connection with the accompanying illustrative drawings.

In the drawings which illustrate the best modes now contemplated by us for carrying out our invention:

Fig. 1 is a vertical sectional view of an inflatable device of predetermined surface contour formed according to the present invention;

Fig. 2 is an enlarged view of the area 2 of Fig. 1;

Fig. 3 is a sectional view taken on the line 3—3 of Fig. 2;

Fig. 4 is a diagrammatic view of fabric material illustrating the step of extending the length of the looped piles of the fabric layers;

Fig. 5 is a side elevational view of a length of pile fabric material;

Fig. 6 is a fragmentary vertical sectional view of a modified form of inflatable device of predetermined surface contour;

Fig. 7 is an enlarged view of the area 7 of Fig. 6;

Fig. 8 is a sectional view taken on the line 8—8 of Fig. 7;

Fig. 9 is a diagrammatic representation of a receptacle formed according to the present invention;

Fig. 10 is a view similar to Fig. 5 illustrating another form of pile fabric material; and Fig. 11 is a fragmentary diagrammatic representation of an airfoil section formed according to the present invention.

Referring to the drawings, and more particularly to Figs. 1 through 3 thereof, there is shown an inflatable device 10 of predetermined surface contour which comprises a casing 12, formed of flexible fluid-impervious material, which in its inflated condition defines said predetermined surface contour. While the casing 12 may be inflated to any desired pressure said casing is adapted to be inflated to a relatively high pressure for certain applications, such as for the formation of airfoils or airfoil sections. The casing 12 comprises a peripherally continuous cylindrical wall 14 of fabric material and said wall is secured to the core member 16 disposed in the casing through the intermediation of the series of radially extending elements 18, the latter being secured to said core member and to the cylindrical wall in the manner to be described in detail hereinafter.

The wall 14 may be formed of any suitable flexible material such as a woven or sewn pile fabric material and in the instant embodiment said wall is formed of a woven pile fabric material having relatively long looped piles 18. While any looped pile fabric material may be utilized to form the casing 12, fabric material having piles of the general character disclosed in application Serial No. 360,435, filed July 9, 1953, for Improvements in Fabrics and Method of Making Same in the name of Charles E. Neisler, Jr. and assigned to the assignee herein is eminently suitable for the formation of said casing.

With reference to Fig. 4, the fabric layers 20 and 22 are woven so that the pile threads 24 thereof are temporarily supported by means of the weft threads 26 so that when the looped portions 28 of said pile threads are released from temporary support in the manner described in detail in the above referred to application, said pile threads may be extended to the condition 18. More particularly, the portions 30 of the pile threads 24 are interwoven with an associated fabric layer and the portions 32 intermediate the interwoven portions thereof are temporarily supported by the association of the looper portions 28 of said pile threads with the temporary weft threads 26 which may be disposed inwardly or outwardly of the fabric layers as described in detail in the aforereferred to application. Thus the pile threads 24 are interwoven with a single fabric layer only and it will be apparent that, if desired, a single fabric layer 20 or 22 may be woven individually to provide fabric material having relatively long piles 18 which are adapted for securement to the core member 16. The method of providing the relatively long piles or stress transmitting elements 18 in the manner illustrated in Fig. 4, corresponds to the method described in the above referred to application except that pursuant to the instant method the piles 18 are interwoven with a single fabric layer only. It will be readily apparent that any desired length of pile 18 may be obtained pursuant to the method of Fig. 4. The length of pile fabric material 36 shown in Fig. 5 corresponds to one of the fabric layers 20 and 22 subsequent to the extension of the piles thereof in the manner described above and said length of material may be readily formed into the peripherally continuous cylindrical wall 14 in any desired manner as by overlapping the end marginal strips 38 and 40 thereof and securing said overlapped strips together in any suitable manner. Thus the peripherally continuous cylindrical wall 14 may be formed of initially flat pile fabric material such as the length of pile fabric material 36.

The looped inner ends 34 of the series of piles or elements 18 may be secured in fixed relation with the core member 16 in any desired manner, and in the illustrated embodiment the longitudinally extending securing rods 42 are threaded through said looped ends and are secured in fixed relation with said core member through the intermediation of the retainer members 44. The retainer members 44 are spaced along the length of the member 16 and are fixed thereto internally of the casing in any suitable manner. The retainer members 44 are provided with a series of spaced apertures 46 which may be arranged relative to the member 16 in any desired manner, said apertures being formed complementary to the rods 42. Accordingly, the rods 42 are supported at spaced intervals along the length of member 16 by means of the retainer members 44, each rod being extended through a series of looped ends 34 of the elements 18 and a companion series of aligned apertures 46 provided in said retainer members. It will be understood that the retainer members 44 are secured to the member 16 so that companion series of apertures 46 are aligned for registry with their companion securing rods 42. While the looped piles or flexible elements 18 are of uniform length in the inflatable device 10, it will be apparent that, if desired, said flexible elements may be of non-uniform length and varied as desired. The core member 16 may be of any desired predetermined surface contour and construction and the surface contour of the casing 12, in its inflated condition, will be a function of the lengths of the flexible elements 18 and the contour of the core member 16. Accordingly where the series of flexible elements 18 are of substantially uniform length as in the case of device 10, the surface contour of the casing 12 will correspond to the contour of the core member 16 disposed therein.

The peripherally extending marginal edge portion 52 of the end wall 50 is secured to the peripherally extending arcuately inturned marginal edge portion 54 of the wall 14 by means of the spaced lines of stitching 56, said marginal edge portions being disposed in overlapping disposition as shown in Fig. 3. It will be apparent that the overlapped marginal edge portions 52 and 54 may be secured to each other in any suitable manner as by a cementing operation or by the latter coupled with a sewing operation. Secured to the wall 50, in any suitable manner, is a conventional valve 58 which provides for the controlled inflation and deflation of the chamber 11 defined by the casing 12. While only one end wall 50 of the casing 12 is illustrated it will be understood that the opposite end wall of the instant embodiment is in all respects identical except such opposite end wall need not be provided with a valve corresponding to the valve 58. The casing 12 has an external layer 60 of any suitable fluid-impervious material such as rubber, rubber compounds, plastic, or the like to render said casing fluid-impervious and to impart to said casing the requisite external surface characteristics for the particular application of the inflatable device 10. It will be apparent that the fluid-impervious layer 60 may be applied to the external surfaces of the walls 14 and 50 in any desired manner. From the above it will be apparent that the flexible elements 18 internally reinforce the inflatable device 10 and provide for the distribution of stresses applied to the casing 12. Thus each of the stress transmission elements or pile threads 18 transmits and distributes the stresses applied to an adjacent area of the casing whereby the provision of the series of elements 18 will effect a substantial internal reinforcement of the casing. The looped piles 18 may be arranged and spaced in any desired manner in the casing and said looped piles are preferably disposed in closely adjacent relation in order to provide a uniform distribution and transmission of the casing stresses. While the series of flexible elements 18 of the instant embodiment are constituted by looped piles it will be understood that said series of elements may be of any desired form and arrangement, for example said elements may be constituted by segments or lengths of any suitable flexible material such as textile or other suitable sheet material. Thus the series of elements 18 are disposed internally of the casing 12 and are connected to the casing and the core member for internally reinforcing said casing, the surface contour of the latter being a function of the length of the flexible elements 18 and the contour of the core member 16. Thus the casing 12 may be of any predetermined surface contour depending on the particular application, the internally disposed structure constituted by the member 16 and the elements 18 reinforcing the device 10 and predetermining the shape thereof.

With reference to Figs. 6, 7, and 8, the inflatable device 10' corresponds in all respects to the inflatable device 10 described above in detail except that the inflatable device 10' is provided with a core member 16' of hollow flexible construction whereby said inflatable device may be deflated and fully collapsed for ease of handling, transportation and storage. The core member 16' may be formed of any suitable flexible material having the requisite structural characteristics and the looped ends 34' of the elements 18' are secured in fixed relation with said core member by means of the rods 42', the latter being secured to said core member through the intermediation of the retainer members 44'. The retainer members 44' extend peripherally of the core member and are formed in integral relation therewith, it being understood that said retainer members may be of any desired construction and configuration whereby to provide for the anchorage of the looped ends 34' of the elements 18 to said core member. Thus the retainer members 44' correspond in all respects to the retainer members 44 previously described except that the retainer members 44' are formed of flexible material and in integral relation with the core member. From the above it will be apparent that in the deflated condition of the device 10' the latter will occupy a relatively small space to facilitate the handling, storage and transportation thereof.

With reference to Fig. 9, there is shown a container 70 formed according to the present invention, said container comprising a casing 72 formed of flexible fluid-impervious material which is adapted to contain any desired fluid material. The casing 72 may be of any desired surface contour which is a function of the surface configuration of the core member 74 and the lengths of elements 76 radially extend between said core member and the casing and secured thereto in the manner described in detail above. The core member 74 is preferably of a hollow, flexible and collapsible construction whereby the container 70 may be collapsed to a compact unit in its empty condition. The casing 72 is provided with a suitable valve or closure 78 to provide for the controlled filling and emptying of the chamber 80 defined by said casing. Thus the receptacle 70 is internally reinforced by means of the core member 74 and the series of stress transmitting elements 76 whereby said container will be of a structurally reinforced light weight construction for supporting the fluid contained therein.

With reference to Fig. 10, there is shown a length of pile fabric material 82 which comprises a fabric layer 84 having looped piles 86 of non-uniform length secured thereto, the looped ends 88 of said piles being adapted to be secured to an associated core member for forming an inflatable device of the general character described above, said device having a surface contour which is predetermined by a surface contour of the associated core member and the length of the series of looped piles 86. The pile fabric material 82, having piles 86 of non-uniform length, may be formed in any desired manner and it will be understood that the lengths of said piles will be predetermined in accordance with the desired surface contour and application of the device to be formed from said fabric material.

With reference to Fig. 11, there is shown a section 90 of an inflatable device of airfoil surface contour, said surface contour being predetermined by the surface contour of the core member 92 and the lengths of the series of elements 94. It will be evident that the elements 94 may be constituted by looped piles or may be of any other suitable form to provide flexible elements extending between the core member 92 and the casing 96. It will therefore be apparent from the above that any desired predetermined surface contour may be obtained in accordance with the present invention and the specific surface contours illustrated and described herein are given by way of example only.

An inflatable device may be formed pursuant to the present invention to simulate any desired object such as a building, a vehicle, military equipment, and the like whereby said inflatable device may be in the form of a camouflaged object of any desired shape. Accordingly the inflatable devices described above may be of any desired surface contour and said devices are utilizable for a multitude of utilitarian applications in any desired form such as in the form of airfoils or airfoil sections, receptacles of predetermined surface shapes, and camouflaged objects of desired shapes.

While we have shown and described the preferred embodiments of our invention, it will be understood that various changes may be made in the idea or principles of the invention within the scope of the appended claims.

Having thus described our invention, what we claim and desire to secure by Letters Patent is:

1. An inflatable device of predetermined surface contour, comprising a fluid-impervious inflatable flexible casing having a peripherally continuous core member disposed therein, and flexible means disposed internally of said casing and extending throughout the periphery of said core member between said core member and said casing for internally reinforcing said casing and for defining the surface contour of said casing as a function of the contour of said core member, said flexible means being connected to said core member and to said casing.

2. An inflatable device of predetermined surface contour, comprising a fluid-impervious inflatable flexible casing having a peripherally continuous core member of predetermined surface contour disposed therein, and a series of flexible elements disposed in closely adjacent relation internally of said casing and connected to said casing and said core member throughout the periphery of the latter for internally reinforcing said casing and for defining the surface contour of said casing as a function of the length of said flexible elements and the contour of said core member.

3. An inflatable device of predetermined surface contour, comprising a fluid-impervious inflatable flexible casing having a peripherally continuous core member disposed therein, and a series of flexible elements of substantially uniform length disposed in closely adjacent relation internally of said casing and extending between said core member and said casing and secured thereto for providing a surface contour to said casing which corresponds to the contour of said core member.

4. An inflatable device of predetermined surface contour, comprising a fluid-impervious inflatable flexible casing having a hollow peripherally continuous flexible core member disposed therein, and flexible means disposed internally of said casing and extending throughout the periphery of said core member between said core member and said casing for internally reinforcing said casing, said casing and said core member being collapsible with the surface contour of said casing in the inflated condition thereof being a function of the contour of said core member, said flexible means being connected to said core member and to said casing.

5. An inflatable device of predetermined surface contour, comprising a flexible inflatable casing having a hollow peripherally continuous flexible core member disposed therein, and a series of flexible elements of substantially uniform length disposed in closely adjacent relation internally of said casing and extending between said core member and said casing throughout the periphery of the latter and secured thereto, said casing and said core member being collapsible with the surface contour of said casing in the inflated condition thereof corresponding to the contour of said core member.

6. An inflatable device of predetermined surface contour, comprising an inflatable casing formed of flexible fluid-impervious textile material, a peripherally continuous core member disposed in said casing, and a series of flexible elements disposed in closely adjacent relation internally of said casing and connected thereto and to said core member for internally reinforcing said casing and for defining the surface contour of said casing as a function of the length of said flexible elements and the contour of said core member.

7. An inflatable device of predetermined surface contour, comprising an inflatable casing formed of flexible fluid-impervious textile material, a peripherally continuous core member disposed in said casing, and a series of flexible elements disposed in closely adjacent relation internally of said casing and connected thereto and to said core member for internally reinforcing said casing and for defining the surface contour of said casing as a function of the length of said flexible elements and the contour of said core member, said flexible elements comprising sheet material portions secured at their opposite edges to said casing and said core member, respectively.

8. An inflatable device of predetermined surface contour, comprising an inflatable casing formed of flexible fluid-impervious material comprising pile fabric material, and a core member disposed in said casing, the piles of said fabric material being disposed internally of said casing and having their initially free end portions secured to said core member in radially extending dispositions.

9. An inflatable device of predetermined surface contour, comprising an inflatable casing formed of flexible fluid-impervious material comprising pile fabric material, and a core member disposed in said casing, the piles of said fabric material being disposed internally of said casing and having their initially free end portions secured to said core member in radially extending dispositions, the piles of said fabric material being of substantially uniform length whereby the surface contour of said casing in its inflated condition corresponds to the contour of said core member.

10. An inflatable device of predetermined surface contour, comprising an inflatable casing formed of flexible fluid-impervious material, and a core member disposed in said casing, said material comprising fabric material having looped piles secured thereto, said piles being disposed internally of said casing and having their looped end portions secured to said core member in radially extending dispositions, said piles and said core member internally reinforcing said casing with the piles being of substantially uniform length whereby the surface contour of said casing in its inflated condition corresponds to the contour of said core member.

11. An inflatable device of predetermined surface contour, comprising an inflatable casing formed of flexible fluid-impervious material comprising pile fabric material, and a core member disposed in said casing, the piles of said fabric material being disposed internally of said casing and having their initially free end portions secured to said core member in radially extending dispositions, said piles and said core member thereby internally reinforcing said casing, the piles of said fabric material being of substantially non-uniform length whereby the surface contour of said casing in its inflated condition corresponds to the contour of said core member.

References Cited in the file of this patent

UNITED STATES PATENTS

| | | |
|---|---|---|
| 2,423,940 | Krupp | July 15, 1947 |
| 2,558,807 | Bailey | July 3, 1951 |
| 2,612,924 | Cunningham | Oct. 7, 1952 |
| 2,666,953 | Andrews | Jan. 26, 1954 |

FOREIGN PATENTS

| | | |
|---|---|---|
| 561,819 | Great Britain | June 6, 1944 |